(12) United States Patent
Koyama et al.

(10) Patent No.: US 6,262,389 B1
(45) Date of Patent: *Jul. 17, 2001

(54) LASER-PROCESSABLE GLASS SUBSTRATE AND LASER PROCESSING METHOD

(75) Inventors: Tadashi Koyama; Keiji Tsunetomo, both of Osaka (JP)

(73) Assignee: Nippon Sheet Glass Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/155,126

(22) PCT Filed: Mar. 14, 1997

(86) PCT No.: PCT/JP97/00823

§ 371 Date: Sep. 22, 1998

§ 102(e) Date: Sep. 22, 1998

(87) PCT Pub. No.: WO97/35813

PCT Pub. Date: Oct. 2, 1997

(30) Foreign Application Priority Data

Mar. 25, 1996 (JP) .................................... 8-068415

(51) Int. Cl.[7] .......................... B23K 26/00; C03C 15/00; C03C 19/00; C03B 33/00
(52) U.S. Cl. ................ 219/121.71; 219/121.71; 219/121.85; 65/30.13; 65/61; 65/112; 65/30.1; 65/31; 204/192.2; 428/131; 428/410; 428/34.4; 428/673

(58) Field of Search ................... 428/410, 34.4, 428/673, 131; 219/121.85; 204/121.71, 192.2; 65/112, 61, 30.1, 31, 30.13

(56) References Cited

U.S. PATENT DOCUMENTS

| 4,125,405 | 11/1978 | Araujo et al. ............ 106/54 |
|---|---|---|
| 4,296,479 | 10/1981 | Wu .................... 365/119 |
| 5,078,771 | 1/1992 | Wu .................... 65/30.11 |
| 5,145,757 | 9/1992 | Smoot et al. ............ 430/5 |
| 5,910,256 | * 6/1999 | Tsunetomo et al. ........ 216/24 |
| 5,951,731 | * 9/1999 | Tsunetomo et al. ........ 65/61 |

FOREIGN PATENT DOCUMENTS

| 4025814 C1 | 8/1990 | (DE) ............... C03C/21/00 |
|---|---|---|
| 54-28590 | 3/1979 | (JP) ................ H01S/3/00 |

OTHER PUBLICATIONS

Chludzinski, P., et al., "Ion exchange between soda–lime–silica glass and sodium nitrate—silver nitrate molten salts", *Physics & Chemistry of Glasses*, vol. 28, No. 5, pp. 169–173, (Oct. 1987).

* cited by examiner

Primary Examiner—Ellis Robinson
Assistant Examiner—Laura L. Lee
(74) Attorney, Agent, or Firm—Schwegman, Lundberg, Woessner & Kluth, P.A.

(57) ABSTRACT

A sheet of silicate glass having a thickness of 2 mm and composed mainly of $SiO_2$, and containing $Al_2O_3$, $B_2O_3$, $Na_2O$, F, etc., is immersed in a molten salt comprising a mixture of 50 mol % of silver nitrate and 50 mol % of sodium nitrate. Na ions in the surface of the glass are eluted, diffusing Ag ions in the molten salt into the glass. When a laser beam is applied to the glass substrate thus formed, the glass substrate is evaporated or ablated progressively from its surface. The glass substrate is processed to a smooth finish without causing cracking or breakage.

11 Claims, 9 Drawing Sheets

100μm

100 μm

LASER-PROCESSABLE GLASS SUBSTRATE AND LASER PROCESSING METHOD

TECHNICAL FIELD

The present invention relates to a glass substrate suitable for being processed by laser, and a method of processing such a glass substrate.

BACKGROUND ART

Laser beams have an intensive energy, and have heretofore been used to increase the temperature of a surface of a material to which the laser beam is applied thereby to ablate or evaporate a portion of the material to which the laser beam is applied, for processing the material in various ways. Since the laser beam can be focused into a very small spot, it is suitable for microscopic topographic processing of a material.

Laser beams are generated by an infrared laser such as a $CO_2$ laser, an Nd:YAG laser, a laser comprising an Nd:YAG laser combined with a wavelength conversion capability for producing a laser beam whose wavelength ranges from a near-infrared region through a visible region to an ultraviolet region, and an ultraviolet laser such as an excimer laser such as an Arf or Krf laser.

Silicate glass composed primarily of $SiO_2$ is highly transparent and can easily be molded (deformed) at high temperatures. Sheets of silicate glass, which have been formed with holes or concavities and convexities by microscopic topographic processing, are widely used as glass substrates for optical components used for optical communications and display devices.

In order to make a hole in a sheet of silicate glass according to microscopic topographic processing, it has been the general practice to process the sheet of silicate glass with wet etching (chemical etching) using an etchant of hydrofluoric acid or the like, or dry etching (physical etching) such as reactive ion etching.

However, the wet etching suffers problems with respect to management and processing of the etchant. The dry etching requires pieces of equipment such as a vacuum container, needs a large-scale apparatus, and is not efficient because a pattern mask has to be produced by complex photolithography.

It has been attempted to use a laser beam for microscopic topographic processing of glass. Since glass is fragile, it tends to crack when processed. If an infrared carbon dioxide laser is used to process glass, the glass will violently crack due to thermal strain.

If an ultraviolet KrF excimer laser (wavelength of 248 nm) is used to process glass, the glass will crack around the area where the laser beam is applied. The ultraviolet KrF excimer laser (wavelength of 248 nm) is thus not suitable for microscopic topographic processing of glass. The use of an ArF excimer laser having a wavelength of 193 nm for emitting a laser beam to process glass is optimum. However, even when such an ArF excimer laser is used, the generation of microcracks is unavoidable.

The ArF excimer laser having a wavelength of 193 nm is subject to absorption by air, and needs to replace the transmission medium with an absorption-free gas such as Ar or a vacuum in order to allow the laser beam to reach as far away as possible.

There has been proposed a technique disclosed in Japanese laid-open patent publication No.54-28590. According to the disclosed technique, when a laser beam is applied to process a glass substrate, the glass substrate has been heated to 300~700° C. in advance to withstand thermal shocks caused when it is processed with the laser beam.

When the glass substrate is subject to microscopic topographic processing by the laser beam while it is being heated to relax stresses, however, the glass substrate cannot be processed to an accuracy ranging from micrometers to submicrometers because of thermal shrinkage.

Even when the glass substrate is subject to microscopic topographic processing by the laser beam while it is being heated, the processed area has a rough surface, but not a smooth finish. The processed glass substrate is still susceptible to cracking or breakage.

The inventors have attempted to apply a laser beam to general photosensitive glass which contains a uniform concentration of Ag ions. The process of applying the laser beam to the general photosensitive glass will be described below with reference to FIGS. 1(a) 1(d) of the accompanying drawings. As shown in FIG. 1 (a), a laser beam applied to a glass substrate enters into the glass substrate, reducing Ag ions present in the glass substrate as shown in FIG. 1(b) thereby to generate a colloid (very fine particles of Ag). When the colloid is separated out, as shown in FIG. 1(c), the coefficient of absorption of the laser beam is greatly increased. The glass substrate now starts being ablated from inside thereof until finally it develops a recess-like crack or breakage as shown in FIG. 1(d).

DISCLOSURE OF THE INVENTION

The present invention has been made in an attempt to eliminate the above conventional drawbacks. It is an object of the present invention to provide a glass substrate which is capable of relaxing thermal stresses, does not develop cracking and breakage, and produces a smooth processed area when a hole or a concavity and a convexity are formed in the glass substrate by laser processing.

Another object of the present invention is to form a microscopic pattern of concavities and convexities on the glass substrate described above with a laser beam.

A laser-processable glass substrate according to the present invention contains silver in the form of Ag atoms, an Ag colloid, or Ag ions from a surface thereof to a predetermined depth and has such a concentration gradient that the concentration of silver is greatest at the surface and progressively decreases from the surface to the predetermined depth.

Another laser-processable glass substrate according to the present invention contains silver throughout its entirety and has such a concentration gradient that the concentration of silver is greatest at a surface thereof and progressively decreases from the surface to an opposite surface.

Still another laser-processable glass substrate according to the present invention contains silver throughout its entirety and has such a concentration gradient that the concentration of silver is smallest (including a concentration of 0 mol %) at an intermediate region in a direction transversely across the glass substrate and progressively increases toward opposite surfaces thereof.

The laser-processable glass substrate may be of a planar shape or a cylindrical shape or any of other desired shapes. The laser-processable glass substrate should preferably comprise silicate glass composed primarily of $SiO_2$ for its high transparency.

The laser-processable glass substrate should preferably contain F (fluorine) in order to reduce coloring due to Ag ions.

For introducing silver into glass to achieve a concentration gradient, Ag ions replace one-valence positive ions other than Ag ions by way of an ion exchange.

If the concentration of silver were low, the absorbed energy of the laser beam would also be low, making the glass substrate to be less susceptible to evaporation or ablation. For this reason, the concentration of silver in an area where the glass substrate is to be processed should preferably be at least 0.1 mol %.

In order to form a through hole or a recess in the laser-processable glass substrate, a laser beam is applied to the surface thereof where the concentration of silver is greatest, as shown in FIG. 2(a) of the accompanying drawings. Then, as shown in FIG. 2(b) of the accompanying drawings, silver (Ag ions) in the surface where the concentration of silver is greatest are reduced into a colloid (very fine particles of Ag). The colloid absorbs the energy of the laser beam, which causes the glass to be melted, evaporated, or ablated to remove a surface layer of the glass, as shown in FIG. 2(c) of the accompanying drawings. When the surface layer is removed, a lower layer of the glass is then similarly removed. Finally, a recess or a through hole is formed as shown in FIG. 2(d) of the accompanying drawings.

A laser beam may be applied to a surface of the glass substrate which is opposite to the surface thereof where the concentration of silver is greatest, as shown in FIG. 3(a) of the accompanying drawings. Then, as shown in FIGS. 3(b)~3(d) of the accompanying drawings, silver (Ag ions) in the surface where the concentration of silver is greatest are reduced into a colloid (very fine particles of Ag) The colloid absorbs the energy of the laser beam, which causes the glass to be melted, evaporated, or ablated to remove a surface layer of the glass. When the surface layer is removed, a lower layer of the glass is then similarly removed. Finally, a recess or a through hole is formed.

The colloid of silver may be formed by applying ultraviolet radiation rather than the laser beam. Since no ablation or the like can be brought about by ultraviolet radiation, however, a laser beam is applied to form a hole or the like in the glass substrate after ultraviolet radiation is applied.

A colloid may be separated out by heating the glass substrate rather than applying ultraviolet radiation or a laser beam.

BEST MODE FOR CARRYING OUT THE INVENTION

Figure 1:
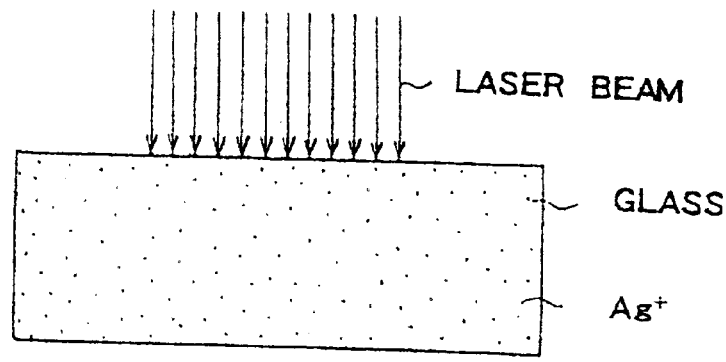
FIGS. 1(a)~(d) are diagrams showing a process of applying a laser beam to photosensitive glass which contains a uniform concentration of Ag ions.
Figure 1:
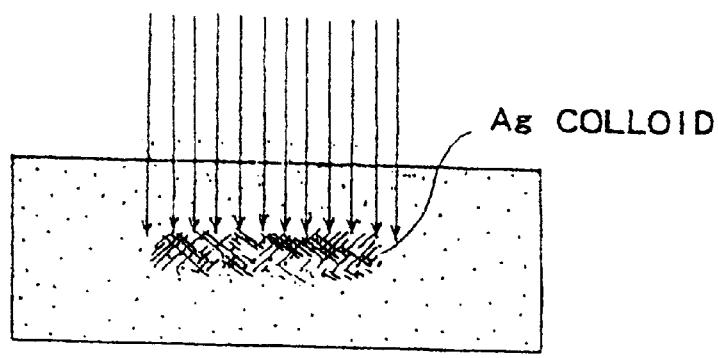
Figure 1:
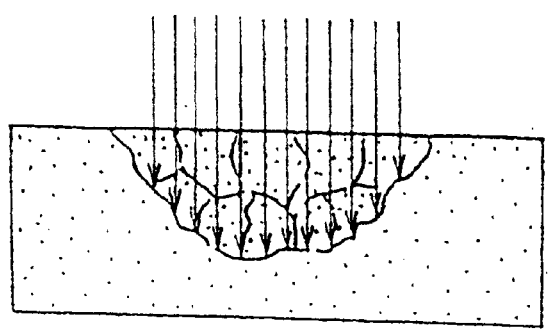
Figure 1:
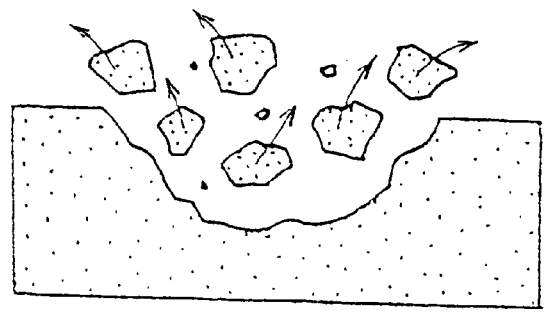
Figure 2:
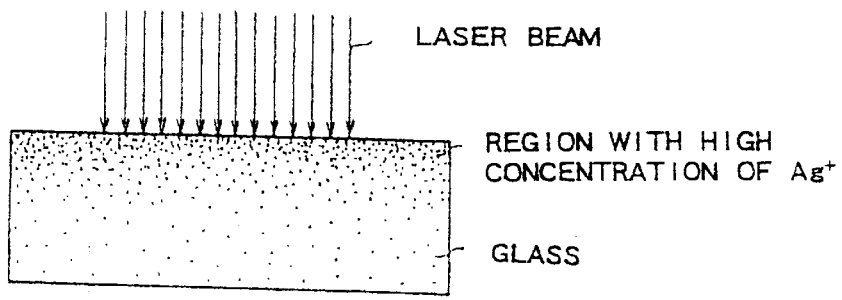
FIGS. 2(a)~2(d) are diagrams showing a process of applying a laser beam to a laser-processable glass substrate according to the present invention.
Figure 2:
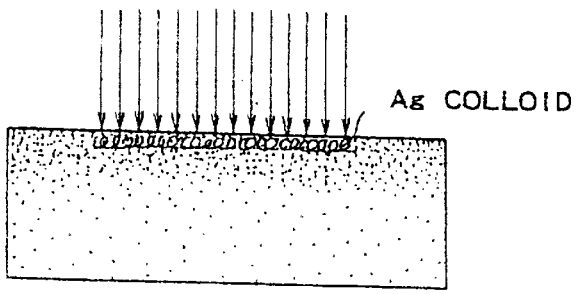
Figure 2:
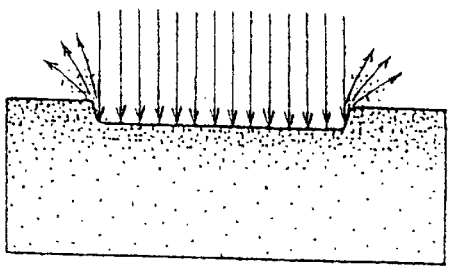
Figure 2:
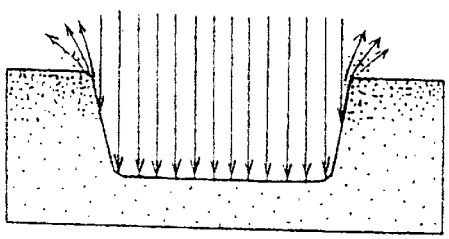
Figure 3:
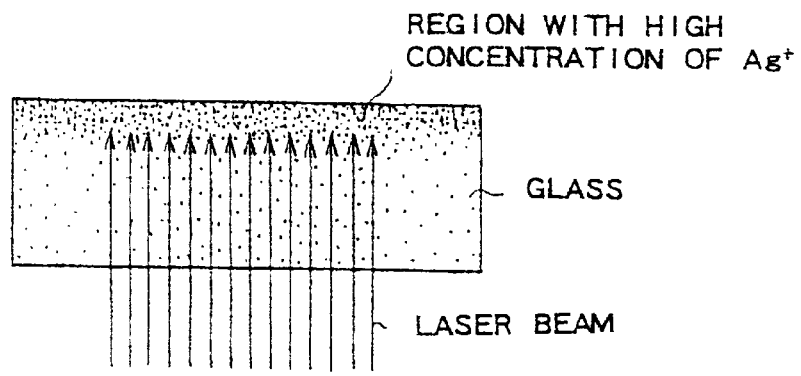
FIGS. 3(a)~3(d) are diagrams similar to FIGS. 2(a)~2(d) except that a laser beam is applied in a different direction.
Figure 3:
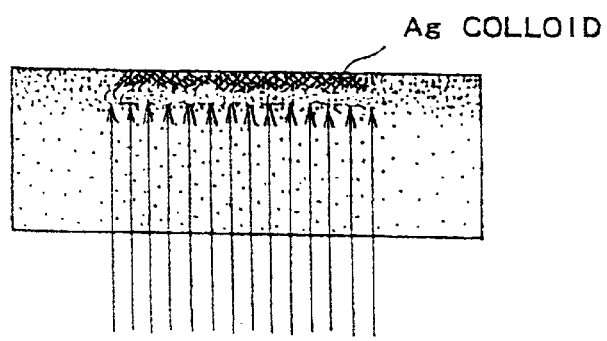
Figure 3:
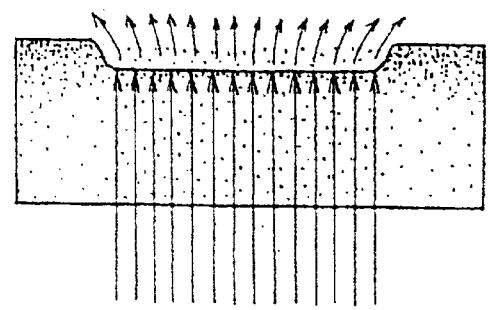
Figure 3:
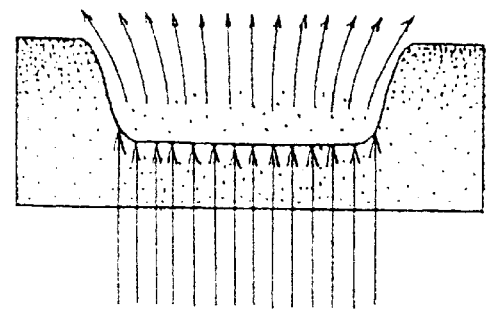

Examples of the present invention will be described below with reference to the accompanying drawings and Tables. Table 1 shows ion exchange conditions, laser beam applying conditions, and laser processability of Inventive Examples. Table 2 shows ion exchange conditions, laser beam applying conditions, and laser processability of Comparative Examples. Table 3 shows specific compositions of glass substrates.

When a glass substrate has laser processability, it means that the glass substrate is free from cracking and breakage and the area of the glass substrate where a laser beam is applied is smooth.

TABLE 1

| | | Ion exchange conditions | | | Laser | |
|---|---|---|---|---|---|---|
| In. Ex. | Glass | Salt concentration | Time | Annealing | Applying conditions | processability |
| In. Ex. 1 | A of Table 3 | Silver nitrate: | 300° C. 15 min. | None | YAG355 nm | ○ |
| | | 50 mol %, | 6 hrs. | " | YAG355 nm | ○ |
| | | Sodium nitrate: 50 mol % | 86 hrs. | " | YAG355 nm | ○ |
| In. Ex. 2 | B of Table 3 | Silver nitrate: 100 mol % | 280° C. 1 hr. | " | YAG355 nm | ○ |
| In. Ex. 3 | C of Table 3 | Same as In. Ex. 1 | 300° C. | " | YAG355 nm | ○ |
| | | | 6 hrs. | " | YAG355 nm | ○ |
| | | | 86 hrs. | " | YAG355 nm | ○ |
| In. Ex. 4 | D of Table 3 | Same as In Ex. 1 | 300° C. 30 min. | " | YAG355 nm | ○ |
| In. Ex. 5 | E of Table 3 | Same as In. Ex. 2 | 300° C. 30 min. | " | YAG355 nm | ○ |

TABLE 1-continued

| | | Ion exchange conditions | | | Laser | |
|---|---|---|---|---|---|---|
| In. Ex. | Glass | Salt concentration | Time | Annealing | Applying conditions | Laser processability |
| In. Ex. 6 | C of Table 3 | Same as In. Ex. 2 | 300° C. 15 min. | " | YAG355 nm | ○ |
| In. Ex. 7 | A of Table 3 | Same as In. Ex. 2 | 300° C. 15 min. | 350° C. 3 hrs. 350° C. 6 hrs. | YAG355 nm | ○ |
| In. Ex. 8 | A of Table 3 | Same as In. Ex. 2 | 300° C. 10 sec. | 350° C. 6 hrs. | YAG355 nm | Δ |

TABLE 2

| Comparative Ex. | Glass | Ion exchange | Applying conditions | Laser processability |
|---|---|---|---|---|
| Comparative Ex. 1 | A of Table 3 | None | YAG248 nm | x |
| Comparative Ex. 2 | B of Table 3 | " | YAG355 nm | x |
| Comparative Ex. 3 | C of Table 3 | " | YAG355 nm | x |
| Comparative Ex. 4 | D of Table 3 | " | YAG355 nm | x |
| Comparative Ex. 5 | E of Table 3 | " | YAG355 nm | x |
| Comparative Ex. 6 | C of Table 3 | " | YAG532 nm | x |
| Comparative Ex. 7 | Antifungal glass | " | YAG355 nm | x |
| Comparative Ex. 8 | A of Table 3 | * | YAG355 nm | x |

*After Ag' is introduced by way of an ion exchange, Ag' in the surface is converted into Na by way of an ion exchange.

TABLE 3

| Comp. Glass | $SiO_2$ | $Al_2O_3$ | $B_2O_3$ | ZnO | MgO | CaO | $Na_2O$ | $K_2O$ | F— | $Ag_2O$ | $Fe_2O_3$ | BaO | $La_2O_3$ |
|---|---|---|---|---|---|---|---|---|---|---|---|---|---|
| A | 56.0 | 20.0 | 11.3 | — | 0.008 | — | 11.0 | 0.002 | 4.15 | 0.006 | 0.008 | — | — |
| B | 63.0 | — | — | — | — | — | 27.0 | — | — | — | — | 7.0 | 3.0 |
| C | 66.3 | 2.4 | 8.6 | — | 8.7 | — | 11.0 | 2.5 | — | — | — | — | — |
| D | 60.1 | — | 3.5 | 14.8 | — | — | 13.2 | 7.7 | — | — | — | — | — |
| E | 71.06 | 1.47 | — | — | 3.920 | 8.88 | 13.41 | 0.820 | — | — | 0.172 | — | — |

INVENTIVE EXAMPLE 1

Figure 4:
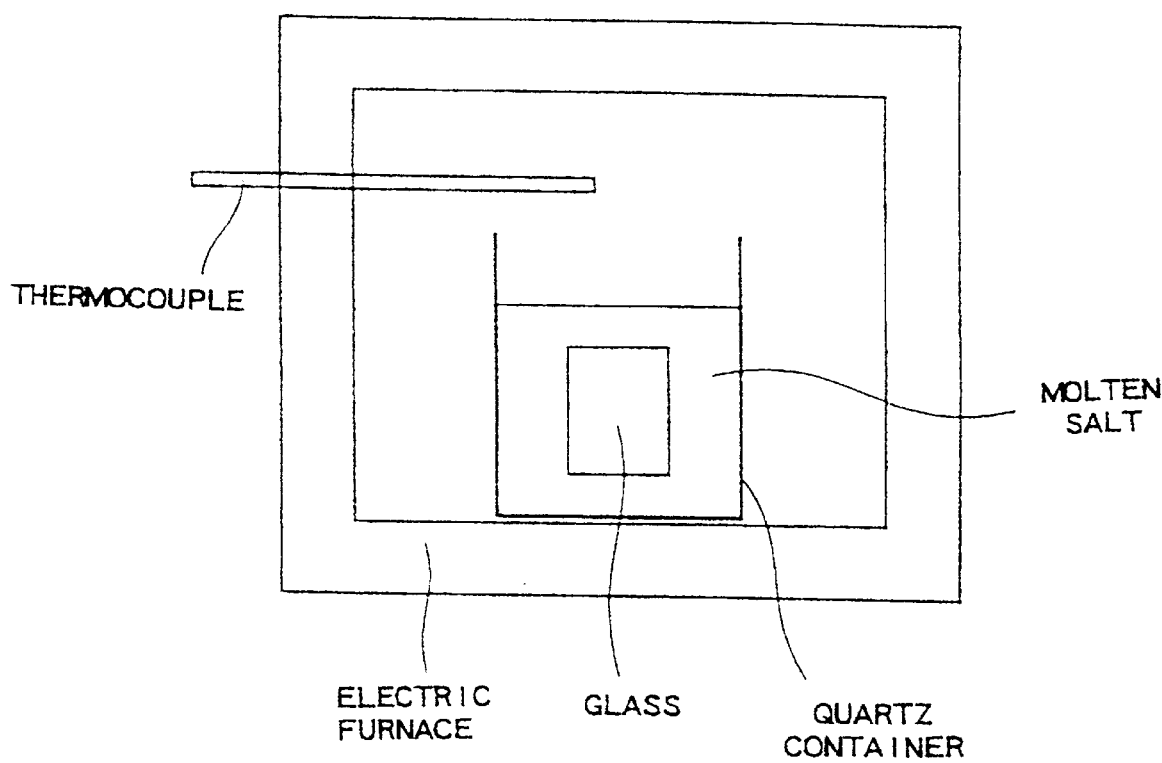
FIG. 4 is a schematic view of a device used for an ion exchange.

An ion exchange was conducted using a device shown in FIG. 4. A glass substrate (A of Table 3) to be processed was in the form of a sheet of silicate glass having a thickness of 2 mm and composed mainly of $SiO_2$ and containing $Al_2O_3$, $B_2O_3$, $Na_2O$, F, etc. A molten salt placed in a quartz container comprised a mixture of 50 mol % of silver nitrate and 50 mol % of sodium nitrate.

Specimens of the glass substrate were immersed in the molten salt in the quartz container for 15 minutes, 6 hours, and 86 hours, respectively. The molten salt was kept at 300° C. in an electric furnace, and a reactive atmosphere was air.

Na ions (one-valence positive ions) in the surface of the glass substrate are eluted, diffusing Ag ions in the molten salt into the glass. The thicknesses of layers into which the Ag ions were diffused, as measured by a microanalyzer, were of about 7 μm for the specimen immersed for 15 minutes, about 30 μm for the specimen immersed for 6 hours, and about 160 μm for the specimen immersed for 86 hours.

Then, a laser beam was applied to the specimens of the glass substrate to remove a certain region thereof by way of evaporation or ablation, trying to produce a recess.

The laser beam was a third harmonic emitted from an Nd:YAG laser and having a wavelength of 355 nm. The laser beam had a pulse duration of about 10 nsec. and a repetitive frequency of 5 Hz, and was focused by a lens before being applied to the glass substrate. The glass had a slight ability to absorb the laser beam having a wavelength of 355 nm.

The spot of the applied laser beam had a size of 360 μm. The energy Of the applied laser beam was 39 J/cm². The laser beam was applied in 30 shots. After the application of the laser beam, a recess having a depth of about 10 μm was formed in the surface of the glass substrate.

Figure 5A:
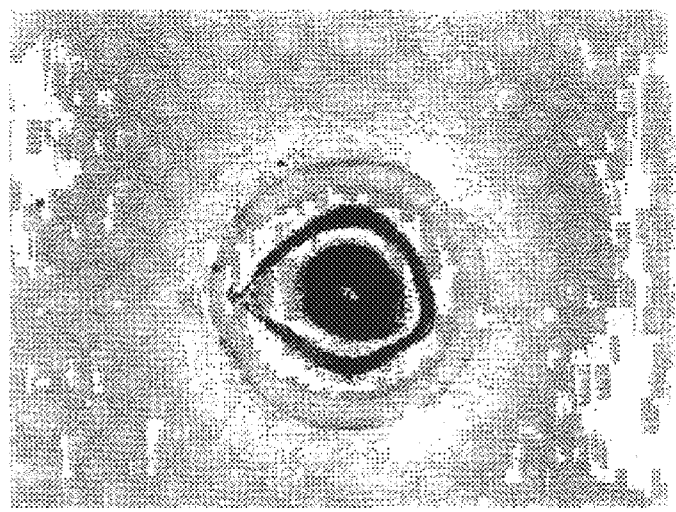
FIG. 5(a) is a photographic representation of a recess formed in the glass substrate according to the present invention, as observed using a microscope.
Figure 5B:
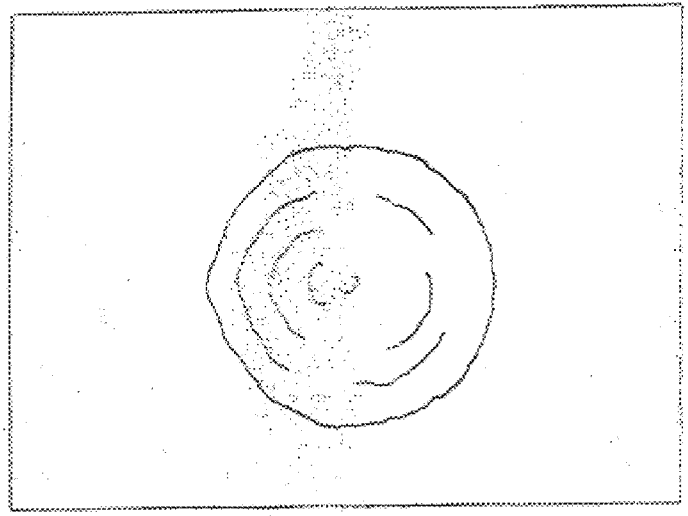
FIG. 5(b) is a diagram produced on the basis of the photographic representation shown in FIG. 5(a)
Figure 6:
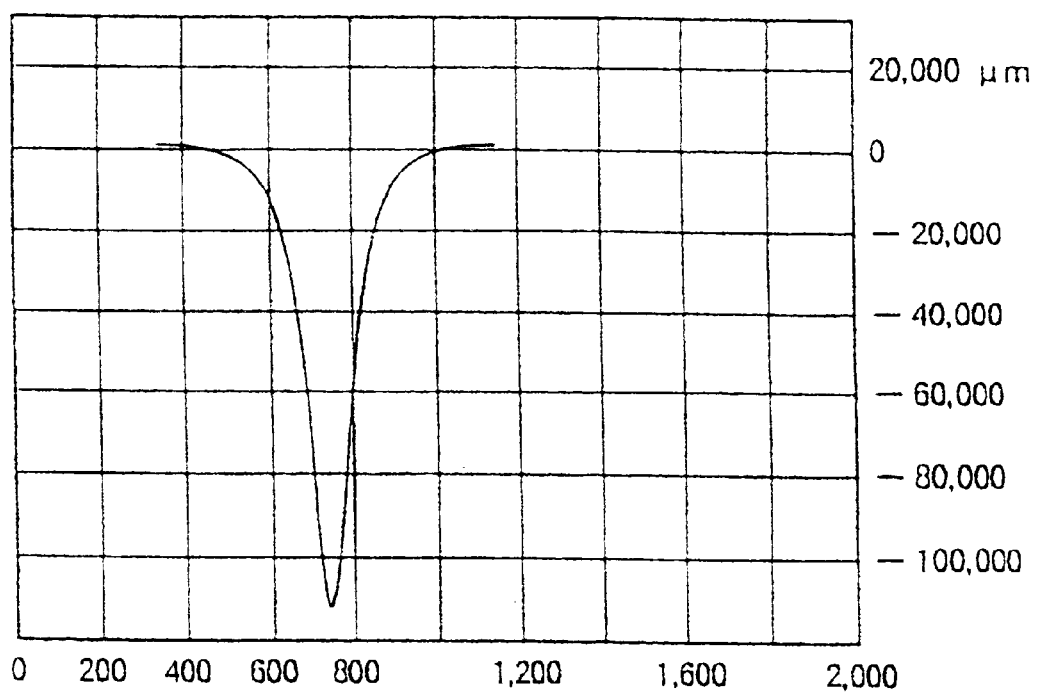
FIG. 6 is a graph showing the recess measured using a surface roughness measuring unit with a stylus.

FIG. 5(a) is a photographic representation of the recess thus formed in the glass substrate, FIG. 5(b) is a diagram produced on the basis of the photographic representation shown in FIG. 5(a), and FIG. 6 is a graph showing the area where the laser beam was applied, measured using a surface roughness measuring unit with a stylus. It can be seen from these figures that there is not cracking or breakage at all around the spot where the laser beam was applied, and the area where the laser beam was applied was smooth, resulting in a smooth profile.

Figure 7:
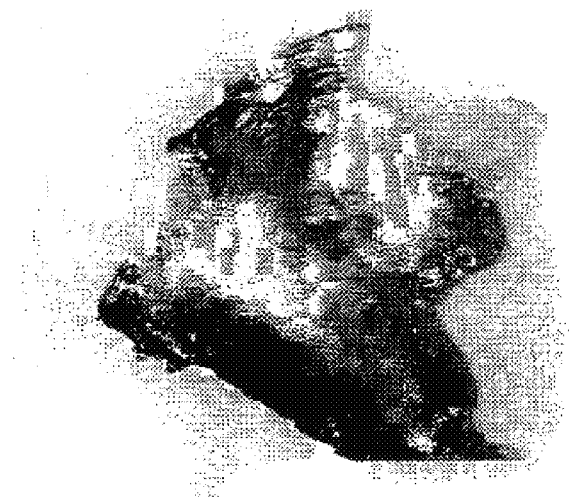
FIG. 7(a) is a photographic representation of a recess formed in a glass substrate which has not been subjected to an ion exchange, as observed using a microscope.
FIG. 7(b) is a diagram produced on the basis of the photographic representation shown in FIG. 7(a)
Figure 7:
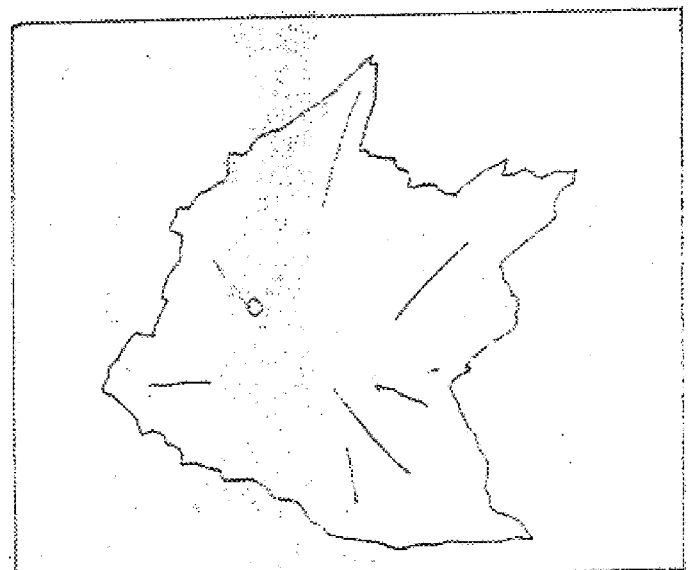

A laser beam was applied under the same conditions to a glass which was not subjected to an ion exchange. FIG. 7(a) is a photographic representation of the recess formed in the glass, and FIG. 7(b) is a diagram produced on the basis of the photographic representation shown in FIG. 7(a). As can be seen from these figures, the glass substrate was violently cracked around the area where the laser beam was applied, and the area where the laser beam was applied had irregular minute concavities and convexities and surface irregularities, and did not have a smooth surface. The irregular concavities and convexities were so large that the surface roughness could not be measured by a surface roughness measuring unit with a stylus.

As described above, the surface which was subjected to an ion exchange was given good processability, and the good processability did not depend on the time required by the ion exchange.

When the laser beam was continuously applied to the glass substrate which was subjected to an ion exchange for 15 minutes, the area to which the laser beam was applied was roughened, losing its laser processability.

Figure 8:
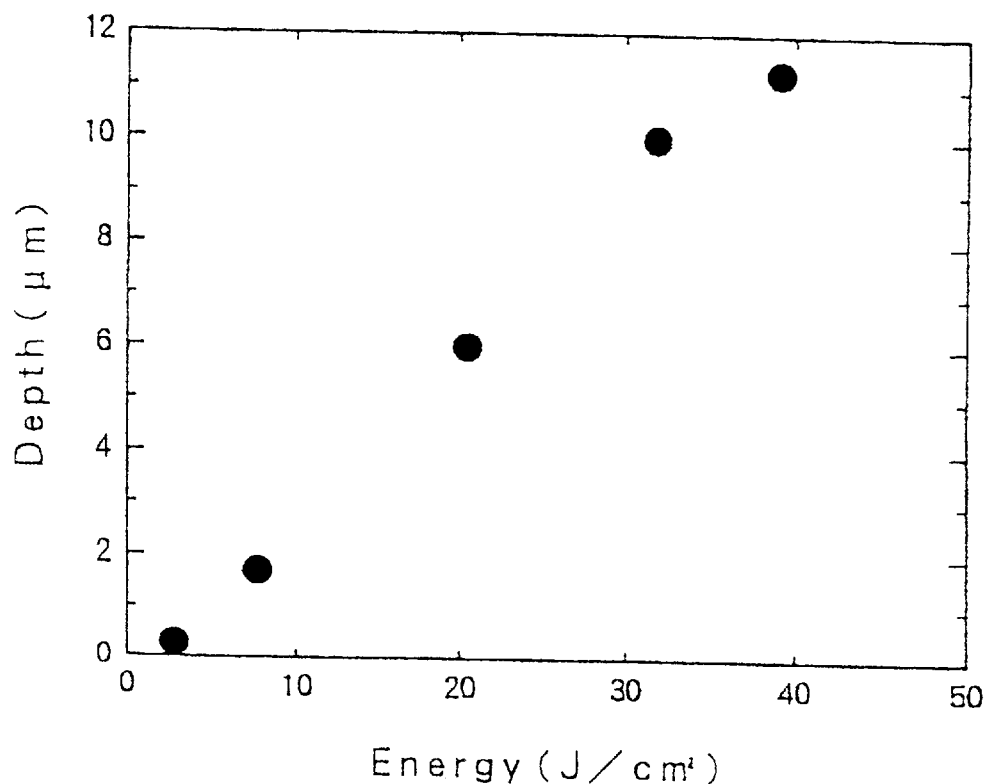
FIG. 8 is a graph showing the relationship between the depths of recesses processed by a laser beam and the energy of the laser beam applied.

The specimens were experimented with the energy of the applied laser beam being changed by changing the position where the laser beam was focused. As a result, it was found that those specimens which were subjected to an ion exchange exhibited good results. The laser beam was applied in 30 shots, and the depths of formed recesses were measured by a surface roughness measuring unit with a stylus for their dependency on the energy of the applied laser beam. As shown in FIG. 8, there is a good linearity between the depths of the formed recesses and the energy of the applied laser beam, allowing adjustments to be easily made by the energy of the applied laser beam which is an important quantity for laser processability.

COMPARATIVE EXAMPLE 1

A laser beam produced by an excimer laser having a wavelength of 248 nm was applied to form a recess in a glass substrate which was of the same composition as the glass substrate in Inventive Example 1 and was not subjected to an ion exchange. As a result, the glass substrate developed cracking and breakage, and no laser processability was observed.

INVENTIVE EXAMPLE 2

An ion exchange was conducted using the device shown in FIG. 4. A glass substrate (B of Table 3) to be processed was in the form of a sheet of silicate glass having a thickness of 2 mm and mainly composed of $SiO_2$ and containing $B_2O_3$, $Na_2O$, etc. As shown in Table 1, the molten salt placed in a quartz container comprised only silver nitrate. The reactive atmosphere was air, and the glass substrate was immersed in the molten salt at 280° C. for 1 hour.

A laser beam emitted from a YAG laser having a wavelength of 355 nm was applied at an energy of 30 j/cm$^2$ to the glass substrate which was subjected to an ion exchange as shown in Table 1.

As a result, the glass substrate which was subjected to an ion exchange exhibited laser processability. When the distribution of Ag ions was measured by an X-ray microanalyzer, almost all Ag ions on the glass surface were exchanged, and their concentration was 27 mol %.

COMPARATIVE EXAMPLE 2

A laser beam produced by a YAG laser having a wavelength of 355 nm was applied at an energy of 30 j/cm$^2$ to a glass substrate which was of she same composition as the glass substrate in Inventive Example 2 and was not subjected to an ion exchange. As a result, the glass substrate developed cracking and breakage, and no laser processability was observed.

INVENTIVE EXAMPLE 3

A glass substrate to be processed had a composition of C of Table 3, and was subjected to an ion exchange under the same conditions as those of Inventive Example 1. A laser beam was applied to the glass substrate under the same applying conditions as those of Inventive Example 1 to check the glass substrate for laser processability. As a result, the glass substrate which was subjected to an ion exchange exhibited laser processability.

COMPARATIVE EXAMPLE 3

A laser beam produced by a YAG laser was applied under the same conditions as those of Inventive Example 3 to a glass substrate which had the same composition as the glass substrate in Inventive Example 3 and was not subjected to an ion exchange. As a result, the glass substrate developed cracking and breakage, and no laser processability was observed.

INVENTIVE EXAMPLE 4

A glass substrate to be processed had a composition of D of Table 3, and was subjected to an ion exchange with the same molten salt as that used in Inventive Example 1 for 30 minutes at 300° C. A laser beam was applied Lo the glass substrate under the same applying conditions as those of Inventive Example 1 to check the glass substrate for laser processability. As a result, the glass substrate which was subjected to an ion exchange exhibited laser processability.

COMPARATIVE EXAMPLE 4

A laser beam produced by a YAG laser was applied under the same conditions as those of Inventive Example 4 to a glass substrate which had the same composition as the glass substrate in Inventive Example 4 and was not subjected to an ion exchange. As a result, the glass substrate developed cracking and breakage, and no laser processability was observed.

INVENTIVE EXAMPLE 5

A glass substrate to be processed had a composition of E of Table 3, and was subjected to an ion exchange with the same molten salt as that used in Inventive Example 1 for 30 minutes at 300° C. A laser beam was applied to the glass substrate under the same applying conditions as those of Inventive Example 1 to check the glass substrate for laser processability. As a result, the glass substrate which was subjected to an ion exchange exhibited laser processability.

COMPARATIVE EXAMPLE 5

A laser beam produced by a YAG laser was applied under the same conditions as those of Inventive Example 5 to a glass substrate which had the same composition as the glass substrate in Inventive Example 5 and was not subjected to an ion exchange. As a result, the glass substrate developed cracking and breakage, and no laser processability was observed.

INVENTIVE EXAMPLE 6

A glass substrate to be processed had a composition of C of Table 3, and was subjected to an ion exchange with the same molten salt as that used in Inventive Example 1 for 15 minutes at 300° C. A laser beam emitted by a YAG laser having a wavelength of 532 nm was applied to the glass substrate to check the glass substrate for laser processability. As a result, the glass substrate which was subjected to an ion exchange exhibited laser processability.

COMPARATIVE EXAMPLE 6

A laser beam produced by a YAG laser was applied under the same conditions as those of Inventive Example 6 to a glass substrate which had the same composition as the glass substrate in Inventive Example 6 and was not subjected to an ion exchange. As a result, the glass substrate developed cracking and breakage, and no laser processability was observed.

INVENTIVE EXAMPLE 7

Specimens of a glass substrate to be processed which was subjected to an ion exchange for 15 minutes under the same conditions as those of Inventive Example 1 were annealed under different conditions, i.e., at 350° C. for 3 hours and at 350° C. for 6 hours. As a result, the concentration of silver, which was 2.57 mol % prior to annealing, was reduced to 0.63 mol % for the specimen that was annealed at 350° C. for 3 hours, and to 0.49 mol % for the specimen that was annealed at 350° C. for 6 hours.

A laser beam emitted from a YAG laser having a wavelength of 355 nm was applied to the annealed specimens at an energy of 40 mJ/pulse, with a pulse duration of about 10 nsec. at a repetitive frequency of 5 Hz.

As a result, laser processability was confirmed for all the specimens. However, the ablation threshold (the energy density at which ablation starts to occur) increased by 4~5 times from the ablation threshold of a glass substrate which was not annealed.

INVENTIVE EXAMPLE 8

Specimens of a glass substrate to be processed were subjected to an ion exchange under the same conditions as those of Inventive Example 1 except that the ion exchange was conducted for a short time of 10 seconds, and then annealed at 350° C. for 6 hours. As a result, the concentration of silver in the surface of the specimens was reduced to 0.06 mol %. A laser beam was applied to the specimens under the same conditions as those of Inventive Example 7.

As a result, some of the specimens, exhibited laser processability, but the other specimens developed cracking and breakage.

As can be seen from Inventive Examples 7 and 8 described above, those specimens which have a concentration gradient of silver exhibit laser processability even though the concentration of silver is low, and the lower limit of silver concentration for which laser processability was confirmed is 0.06 mol %. Not all specimens, but 20~30% thereof, exhibit laser processability. For a glass substrate to exhibit reliable laser processability, the concentration of silver thereof needs to be of 0.1 mol % or higher.

COMPARATIVE EXAMPLE 7

A laser beam emitted from a YAG laser having a wavelength of 355 nm was applied to antifungal glass with a uniform content of silver ($SiO_2$: 37.5 mol %, $B_2O_3$: 46.5 mol %, $Na_2O$: 15.8 mol %, $Ag_2O$: 0.28 mol %) at an energy of 88 mJ/pulse, with a pulse duration of about 10 nsec. at a repetitive frequency of 5 Hz. As a result, the area to which the laser beam was applied was rendered rough with cracking observed around the area.

COMPARATIVE EXAMPLE 8

A glass substrate to be processed was fabricated which had a low concentration of silver in the surface and a concentration gradient with the silver concentration progressively increasing from the surface into the glass substrate. The glass substrate was fabricated by immersing a blank glass substrate in a molten salt composed of a mixture of 50 mol % of silver nitrate and 50 mol % of sodium nitrate, for 60 minutes, so that the glass substrate had a concentration gradient with the silver concentration being greatest at the surface and progressively decreasing away from the surface, as with Inventive Example 1. The glass substrate was then immersed in a molten salt composed of 62.5 mol % of sodium nitrite and 37.5 mol % of sodium nitrate, for 20 minutes, replacing Ag ions in the surface again with Na ions. As a result, the glass substrate had a lowered silver concentration in the surface with the silver concentration being greatest in a intermediate region in a direction transversely across the glass substrate.

A laser beam emitted from a YAG laser having a wavelength of 355 nm was applied to the glass substrate at an energy of 40 mJ/pulse, with a pulse duration of about 10 nsec. at a repetitive frequency of 5 Hz. As a result, the area to which the laser beam was applied was rendered rough with cracking observed around the area.

The same results were obtained when the glass substrate was immersed first in silver nitrate and sodium nitrate for 15 minutes and then in sodium nitrate for 120 minutes.

It can be understood prom Comparative Examples 7 and 8 described above that a glass substrate does not exhibit laser processability if it simply contains silver or has a high silver concentration at its center, and a glass substrate is required to have a silver concentration which is greatest at its surface and progressively decreases away from the surface in order to exhibit laser processability.

Figure 9:
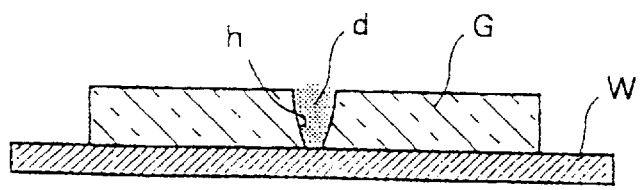
FIG. 9 is a view of a specific product which has been produced by processing the glass substrate according to the present invention with a laser beam.
Figure 10:
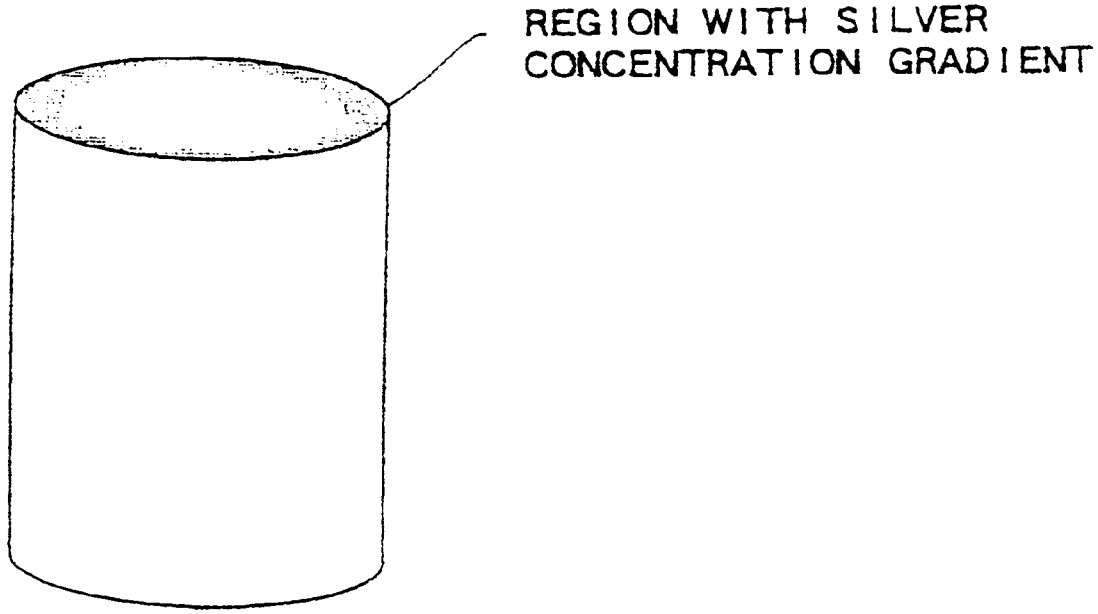
FIG. 10 is a view of another shape of glass substrate according to the present invention.

FIG. 9 shows a specific product which has been produced by processing the glass substrate according to the present invention with a laser beam. The product comprises a glass substrate G mounted on a silicon base W, the glass substrate G having a composition according to the present invention. A through hole h is formed into the glass substrate G by laser processing, and a conductive body d is disposed in the through hole h for electrically connecting a circuit formed on the glass substrate G and the silicon base W.

A glass substrate with through holes formed therein may be incorporated in an ink jet head, and a glass substrate with recesses formed therein maybe incorporated in a microlens array or the like.

The glass substrate is not limited to a planar shape, but may be of a cylindrical or prismatic shape. If the glass substrate is of a cylindrical or prismatic shape, then it has such a concentration gradient that the silver concentration is greatest at its outer surface and progressively decreases toward the center of the glass substrate.

As described above, the laser-processable glass substrate according to the present invention contains silver in the form of Ag atoms, an Ag colloid, or Ag ions from a surface thereof to a predetermined depth and has such a concentration gradient that the concentration of silver is greatest at the surface and progressively decreases from the surface to the predetermined depth, or contains silver throughout its entirety and has such a concentration gradient that the concentration of silver is greatest at a surface thereof and progressively decreases from the surface to an opposite surface, or contains silver throughout its entirety and has such a concentration gradient that the concentration of silver is smallest at an intermediate region in a direction transversely across the glass substrate and progressively increases toward opposite surfaces thereof. When a hole or a concavity and a convexity are formed in the glass substrate by a laser beam, the glass substrate is capable of relaxing thermal stresses, does not develop cracking and breakage, and produces a smooth processed area. Therefore, the glass substrate is suitable for being processed by a laser beam to form a microscopic topographic pattern of concavities and convexities, draw an image on its surface, or form microscopic holes therein.

When the glass substrate is subjected to microscopic laser processing, the glass substrate does not lose its inherent transparency and insulation, a heating device and a vacuum container are not required, and the glass substrate can be processed microscopically at room temperature.

INDUSTRIAL APPLICABILITY

A glass substrate and a method of processing the glass substrate with a laser beam are contributable to the fabrication of an optical product such as a planar microlens array or the like.

We claim:

1. Method of producing a glass article having at least one hole (h) or a recess, respectively, at a predetermined location in the surface thereof, characterized by the steps of providing a glass substrate (G) containing silver in the form of Ag atoms, an Ag colloid, or Ag ions, and having such a concentration gradient that the concentration of silver is greatest at said surface and progressively decreases from the surface towards the interior, and forming said at least one hole (h) or recess by irradiating said glass substrate (G) at said predetermined location with a laser beam, thereby to remove portions of said glass substrate (G) by way of melting, evaporation or ablation due to absorption of energy of said laser beam.

2. Method of producing a glass article according to claim 1, characterized by the step of applying ultraviolet radiation to the glass substrate to reduce Ag ions in the glass substrate into a colloid prior to applying said laser beam to said predetermined location.

3. Method of producing a glass article according to claim 1, characterized in that the silver content of said glass substrate is locally restricted to a predetermined depth from the surface towards the interior of said glass substrate.

4. Method of producing a glass article according to claim 1, characterized in that said glass substrate contains silver throughout its entirety and having such a concentration gradient that the concentration of silver is greatest at said surface and progressively decreases from said surface to an opposite surface.

5. Method of producing a glass article according to claim 1, characterized in that said glass substrate contains silver throughout its entirety and having such a concentration gradient that the concentration of silver is smallest at an intermediate region in a direction transversely across the glass substrate and progressively increases towards opposite surfaces thereof.

6. Method of producing a glass article according to claim 1, characterized in that said glass substrate (G) is of planar shape.

7. Method according to claim 1 characterized in that said glass substrate comprises silicate glass composed primarily of $SiO_2$.

8. Method of producing a glass article according to claim 1, characterized in that said glass substrate contains F (fluorine).

9. Method of producing a glass article according to claim 1, characterized in that the silver is introduced in the glass substrate as Ag ions to replace other one-valance positive ions by an ion exchange.

10. Method of producing a glass article according to claim 1 wherein the greatest concentration of silver is at least 0.1 mol %.

11. Method of producing a glass article according to claim 1, characterized in that said glass substrate is annealed to lessen the concentration gradient of silver.

* * * * *

UNITED STATES PATENT AND TRADEMARK OFFICE
CERTIFICATE OF CORRECTION

PATENT NO.    : 6,262,389 B1
DATED         : July 17, 2001
INVENTOR(S)   : Tadashi Koyama and Keiji Tsunetomo It is certified that error appears in the above-identified patent and that said Letters Patent is hereby corrected as shown below:

Column 2,
Line 8, delete "FIGS. 1(a) 1(d)" and insert -- FIGS. 1(a)-1(d) --, therefor.

Column 3,
Line 30, insert -- . -- , between "Ag)" and "The".

Column 4,
Under Table 1, in example No. 3, under column "Time", insert -- 15 min. -- after "300º C."

Signed and Sealed this

Ninth Day of July, 2002

Attest:

Attesting Officer

JAMES E. ROGAN
Director of the United States Patent and Trademark Office